United States Patent [19]

Cerf

[11] Patent Number: 5,046,600
[45] Date of Patent: Sep. 10, 1991

[54] APPARATUS AND METHOD FOR AUTOMATICALLY LIFTING CONVEYOR SECTIONS

[76] Inventor: Alain Cerf, 10650 72nd St. North, Bldg. 402, Largo, Fla. 34647

[21] Appl. No.: 454,663

[22] Filed: Dec. 21, 1989

[51] Int. Cl.⁵ .............................. B65G 15/44
[52] U.S. Cl. .................................. 198/697; 198/779
[58] Field of Search ................. 198/697, 779, 718

[56] References Cited

U.S. PATENT DOCUMENTS

| | | | |
|---|---|---|---|
| 1,768,482 | 6/1930 | Koch | 198/697 X |
| 2,374,659 | 5/1945 | Bassler | 198/718 |
| 3,534,848 | 10/1970 | Resener et al. | 198/697 |
| 3,770,096 | 11/1973 | Stohlquist | 198/779 X |
| 4,410,079 | 10/1983 | Niederer et al. | 198/779 X |

Primary Examiner—Robert P. Olszewski
Assistant Examiner—Cheryl L. Gastineau
Attorney, Agent, or Firm—Joseph C. Mason, Jr.; Ronald E. Smith

[57] ABSTRACT

A packaging machine of the type having a conveyor formed of pivotally mounted sections includes a mechanism for automating the raising and lowering of the sections. Each section includes a pair of rollers including a first, long roller that extends transversely across the conveyor and which remains in the plane of the conveyor when the section is pivoted upwardly, and either a second roller of short transverse extent or a second roller of intermediate transverse extent that pivots upwardly above the plane of the conveyor when activated. The pivoting action is accomplished by selectively positioning elongate rail members, having a longitudinal extent substantially equal to the length of the conveyor, in the path of travel of connector plates that rigidly depend from opposite ends of each pair of rollers.

20 Claims, 7 Drawing Sheets

APPARATUS AND METHOD FOR AUTOMATICALLY LIFTING CONVEYOR SECTIONS

TECHNICAL FIELD

This invention relates, generally, to packaging machines. More particularly, it relates to a shrink wrap packaging machine of the bucket type.

BACKGROUND ART

Packaging machines of the shrink wrapping type typically include a first or inlet conveyor section, a cut and seal station, a heat tunnel for shrinking the film that wraps the packages, and a second or outlet conveyor station.

A very popular shrink wrap machine, invented by the present inventor in France about twenty-five years ago, includes a first conveyor means that has plural pivotally mounted sections that can be selectively pivoted so that they project above the plane of the conveyor in preselected patterns. When pivoted upwardly, these section drive the trailing edge of their associated package forwardly through the machine. In the industry, machines of this type have come to be called bucket machines because a package carried by flat, unpivoted sections that is preceded and succeeded by raised or upwardly pivoted sections is said to be in a bucket. The upwardly pivoted sections are often called buckets as well.

Where packages of short longitudinal extent are to be shrink wrapped, every bucket along the extent of the bucket conveyor is pivoted upwardly. Where a package having a longitudinal extent about double that of a short package is to wrapped, every other bucket is pivoted upwardly. Where a package having a longitudinal extent about triple that of a short package is to wrapped, every third bucket is pivoted upwardly, and so on.

Heretofore, the buckets have been pivoted upwardly by manual means. However, there are a number of problems with such manual pivoting of the buckets. First of all, manual pivoting of each bucket is time consuming. Secondly, human error often occurs and the required pattern of lifted buckets may be interrupted, resulting in rejected packages. Moreover, the raised buckets must be manually lowered after the shrink wrapping has taken place. For all of these reasons, a means for automatically raising every bucket, every other bucket, every third bucket and so on is desirable. Moreover, an automatic means for lowering the buckets is equally desirable, but the prior art neither teaches nor suggests how such objects could be achieved.

DISCLOSURE OF INVENTION

A conveyor structure is made of plural pivotally mounted sections that are longitudinally spaced from one another along the extent thereof. As in conventional bucket-type machines, standard, non-pivotally mounted rollers are positioned between the pivotally mounted sections.

The movable sections or buckets are selectively pivotally raised above the plane of the conveyor by an automatic means, and are automatically lowered as well.

In a first configuration, every bucket is pivotally raised so that packages of short longitudinal extent are carried between closely longitudinally spaced buckets. In a second configuration, every second bucket is raised and in a third configuration, every third bucket is raised. Thus, packages that are double and treble the length of a standard, short package are also accommodated by the machine.

The automatic pivoting of the conveyor sections or buckets is accomplished by a mechanism that includes three longitudinally extending, elongate rail members, two of which are positioned on a first side of the inlet conveyor and the third of which is positioned on a second, opposite side thereof. All three rails have a common longitudinal extent and extend from the beginning of the inlet conveyor to the station where the film is cut and sealed.

The rails are selectively positionable in two positions: a first, lowered position and a second, raised position. Suitable pneumatic means are provided to raise and lower the rails as needed.

The rails, when lifted, engage and thereby cause the upward pivoting of flanged connectors that rigidly depend to opposite ends of the pivotally mounted buckets. More particularly, the flanged connectors are positioned in a predetermined pattern so that a first group of flanged connectors is abuttingly engaged and pivoted upwardly when the first rail is raised to its elevated position, a second group of flanged connectors is abuttingly engaged and pivoted upwardly when the second rail is lifted, and a third group of flanged connectors is engaged and pivoted upwardly when the third rail is lifted, and all flanged connectors are abuttingly engaged and pivoted upwardly when all three rails are lifted.

The buckets or pivotally mounted conveyor sections are formed of four different roller assemblies, two of which are long assemblies and two of which are short. All four assemblies, however, include one long roller that extends transversely from a first side of the conveyor to a second side thereof, having its opposite ends carried by a conventional conveyor chain or linkage. Each long roller is the pivot axis about which each conveyor section pivots.

More particularly, the four assemblies are assembled from rollers of three differing lengths: a long roller common to all four assemblies as aforesaid, a short roller common to the two "short" assemblies and an intermediate roller common to the two "long" assemblies, in other words, all four assemblies include one long roller, all long assemblies contain one long roller and an intermediate in length roller, and all short assemblies include one long roller and one short roller.

A first long roller assembly includes a flanged connector at a first end and a flat connector at its second end. The flanged connectors and flat connector of the second long roller assembly are reversed vis a vis the first long roller assembly.

Similarly, a first short roller assembly includes a flanged connector at a first end and a flat connector at a second end. However, a second roller assembly includes flanged connectors at both ends.

In this manner, the flanged connectors form a three lane structure that corresponds to the three rails so that each rail, when elevated as aforesaid, pivots different flanged connectors and thus raises different patterns of buckets.

Other structures could be employed to selectively raise the buckets, so it is the method of raising preselected patterns of buckets that forms the heart of this invention. This disclosure includes breakthrough technology because the industry has tried to improve, without success for twenty-five years, the manually operated bucket machine. Accordingly, it pioneers the art of automatic bucket machines and the claims appended hereto are therefor entitled to broad interpretation, so as to protect the heart of this significant invention. This invention is new and useful. Moreover, it clearly was not obvious to those of ordinary skill in the art at the time it was made, in view of the prior art taken as a whole.

The primary object of this invention is to automate conveyor machines of the bucket type.

The invention accordingly comprises the features of construction, combination of elements and arrangement of parts that will be exemplified in the construction set forth hereinafter and the scope of the invention will be set forth in the claims.

DESCRIPTION OF THE DRAWINGS

Similar reference numerals refer to similar parts throughout the several views of the drawings.

BEST MODES FOR CARRYING OUT THE INVENTION

Figure 1:
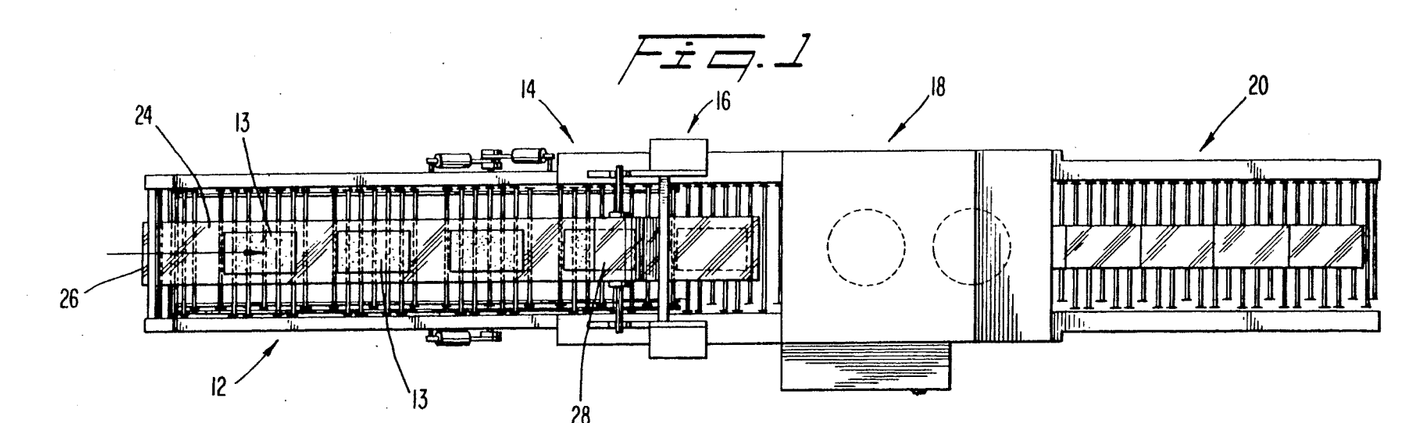
FIG. 1 is a top plan view of an illustrative embodiment of a novel machine capable of performing the steps of the novel method.
Figure 2:
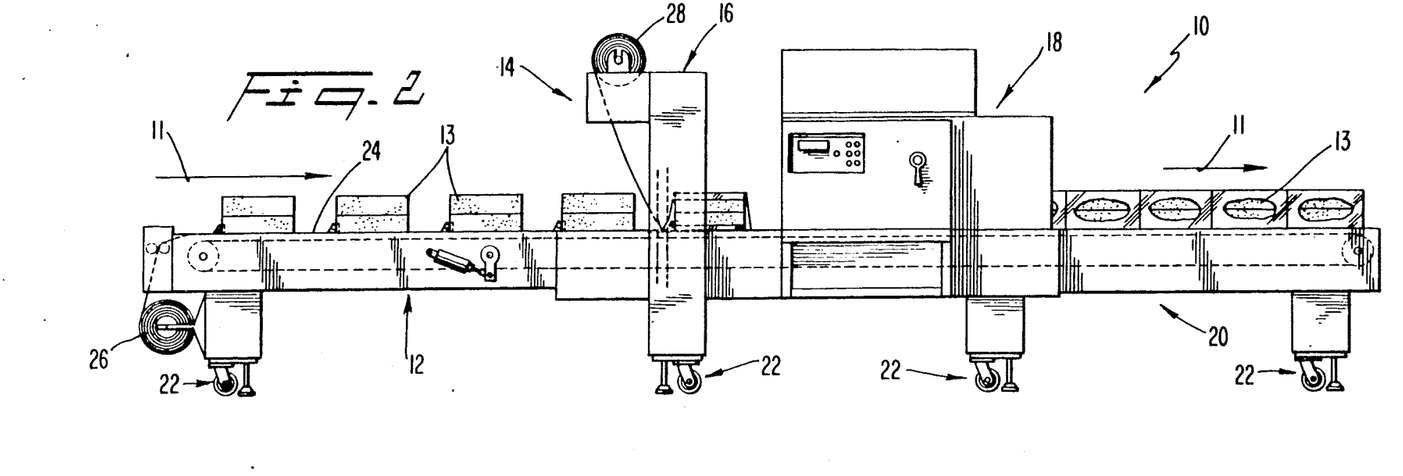
FIG. 2 is a side elevational view thereof.

Referring now to FIGS. 1 and 2, it will there be seen that an exemplary embodiment of a machine that performs the novel method is denoted by the reference numeral 10 as a whole.

Machine 10 includes inlet conveyor section 12, film wrap station 14, seal and cut station 16, heat tunnel 18 where the film is shrunk and outlet conveyor section 20 from which the wrapped product is off-loaded.

The machine is supported at longitudinally spaced intervals along its extent by wheels and support legs, collectively denoted 22. The packages are conveyed from left to right in FIGS. 1 and 2, as indicated by the directional arrows 11 in FIG. 2, and are positioned atop a layer of film 24 that extends from film roll 26 to film roll 28. The film is generally vertically disposed in the path of travel of packages 13 as they pass beneath roll 28 so that the leading edge of each package causes each roll 26, 28 to rotate about its spindle to thereby supply additional film as each package displaces the vertically disposed film barrier.

These and other details concerning the general operation of machine 10 are well known to the art.

Figure 3:
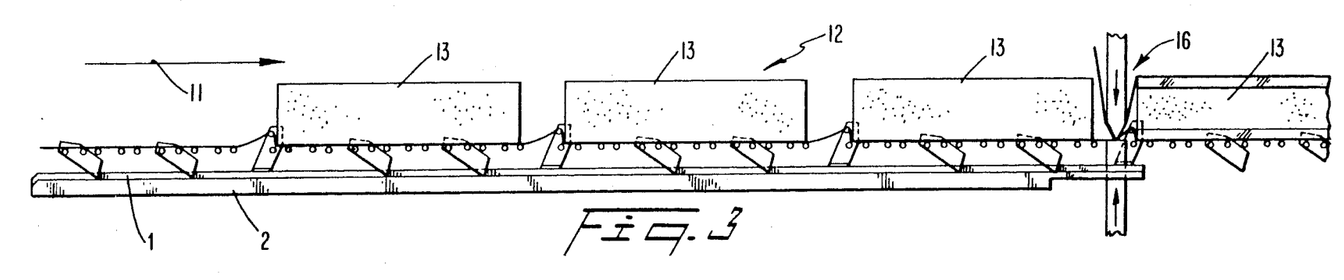
FIG. 3 is a diagrammatic side elevational view showing every third bucket pivoted upwardly.
Figure 4:
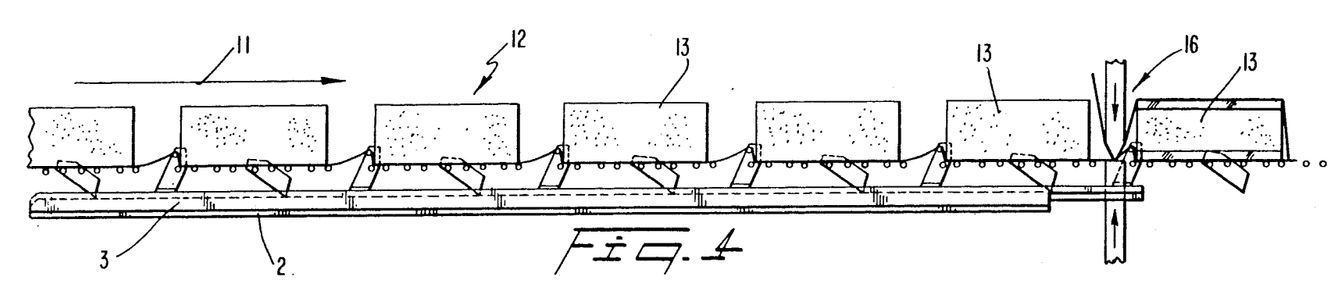
FIG. 4 is a diagrammatic side elevational view showing every second bucket pivoted upwardly.
Figure 5:
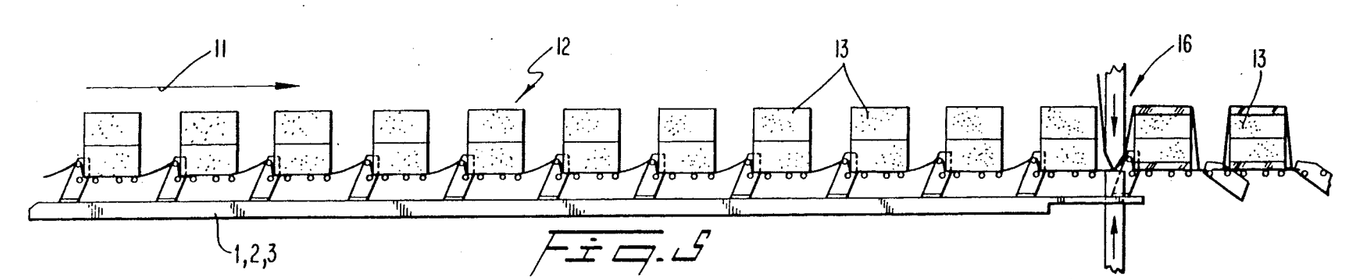
FIG. 5 is a diagrammatic side elevational view showing every bucket pivoted upwardly.

FIG. 3 shows how every third bucket or conveyor section is pivoted upwardly when elongate packages are being wrapped, FIG. 4 shows every other bucket raised for shorter packages and FIG. 5 shows every bucket raised to accommodate short packages. It should be observed that the buckets return, under the influence of gravity, to their unpivoted, flat configuration after the film has been cut and sealed at station 16, as perhaps best understood in connection with FIG. 5. Thus, as shown in FIGS. 3-5, it should be understood that the three rails 1, 2 and 3 do not extend past the cutting and sealing station 16. It should also be observed from the left side of FIG. 5 that the rails begin at the beginning of the inlet conveyor 12. The preselected flanged connectors abuttingly engage their associated elevated rails at the very beginning of each rail, i.e., at the left side of FIGS. 3-5, and the upward pivoting motion of each flanged connector occurs at that point and the conveyor sections or buckets are maintained in their upwardly pivoted configuration as said buckets or conveyor sections travel along the extent of conveyor inlet 12 as is apparent from said FIGS.

Figure 6:
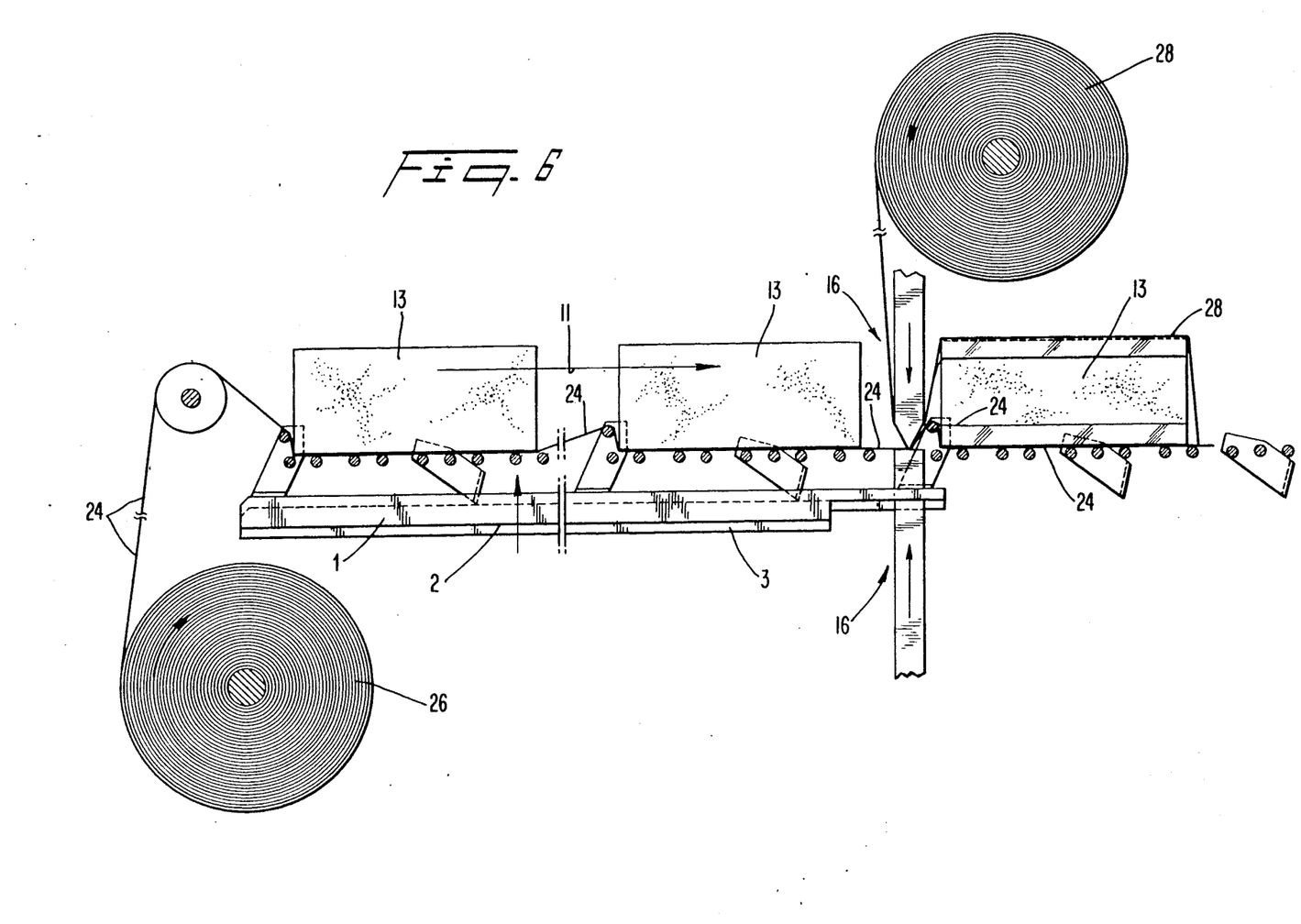
FIG. 6 is a diagrammatic side elevational view similar to FIG. 4 but showing increased detail.

A more detailed view of the novel structure appears in FIG. 6. The vertical film barrier and the path of film travel are depicted in said FIG., but such features are known in the art.

Figure 11:
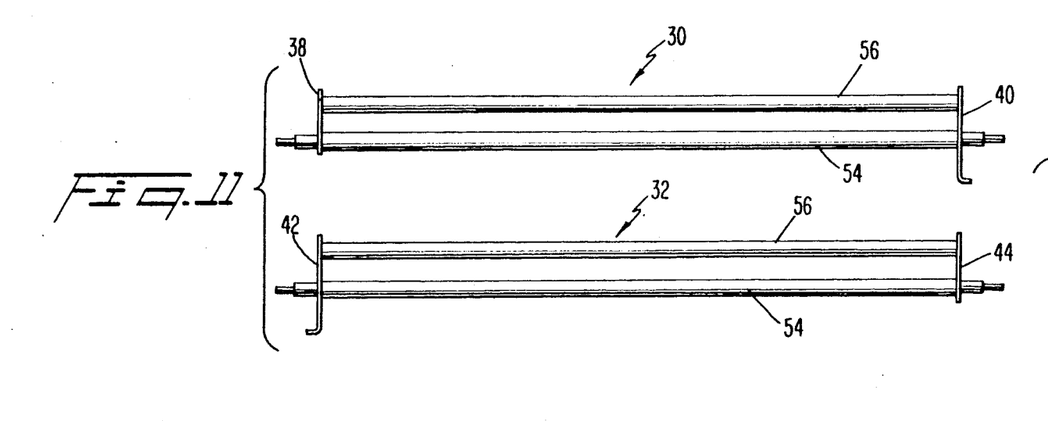
FIG. 11 is an elevational view of the two long roller assemblies.
Figure 12:
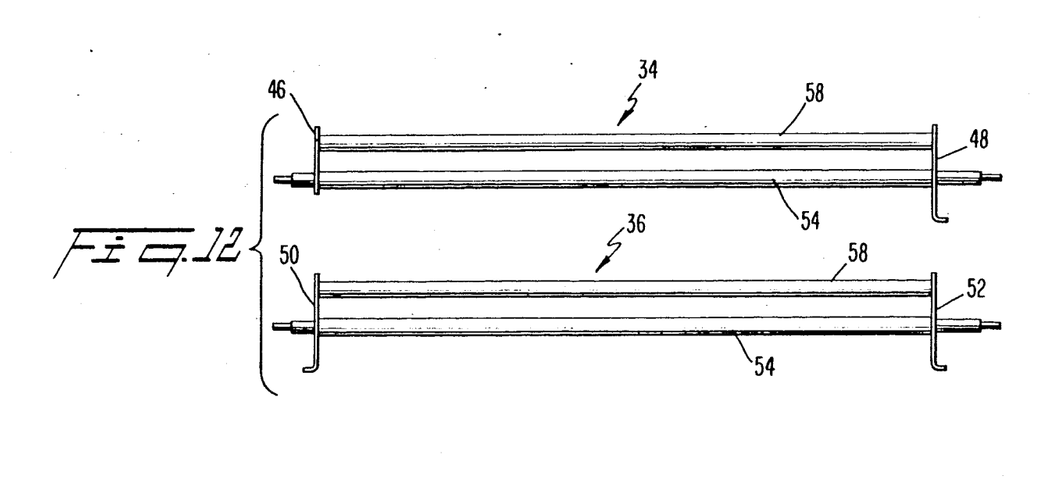
FIG. 12 is an elevational view of the two short roller assemblies.

The four bucket assemblies or conveyor sections of this invention are depicted in FIGS. 11 and 12. The long assemblies are denoted 30, 32 and the short assemblies are denoted 34, 36. Long assembly 30 includes a flat connector plate 38 at its first end and a flanged connector plate 40 at its second end. Long assembly 32 includes a flanged connector plate 42 at its first end and a flat connector plate 44 at its second end. Short assembly 34 includes a flat connector plate 46 at its first end and a flanged connector plate 48 at its second end. Short assembly 36 includes a flanged connector plate 50 at its first end and a flanged connector plate 52 at its second end.

The long roller of each assembly is denoted 54, the intermediate in length rollers are denoted 56 and the short rollers are denoted 58.

Long rollers 54 remain in the plane of the conveyor 12 at all times since the respective opposite ends thereof are rotatably mounted in opposing, laterally spaced apart sides of the main inlet conveyor structure 12, i.e., said long rollers 54 provide the pivotal axis about which the short and intermediate length rollers pivot.

The intermediate and short rollers pivot upwardly (above the horizontal plane of inlet conveyor 12) when their associated flanged connectors abuttingly engage a raised rail individual thereto as will become more clear as this description proceeds. More particularly, as long as the three rails 1, 2, 3 are not raised, the flanged connectors engage no rails and the inlet conveyor 12 presents a flat horizontal profile and there are no buckets to abuttingly engage the respective trailing edges of the packages. When preselected rails are raised, certain flanged connectors abuttingly engage them and cause the bucket assemblies shown in FIGS. 11 and 12 to pivot upwardly in a manner that will be made more clear as this description continues. The unflanged or flat connector plates are unaffected regardless of the position of the rails, and serve, as their name implies, simply to connect the rollers and to maintain their parallel relation to one another as best understood in connection with FIGS. 11 and 12.

Figure 7:
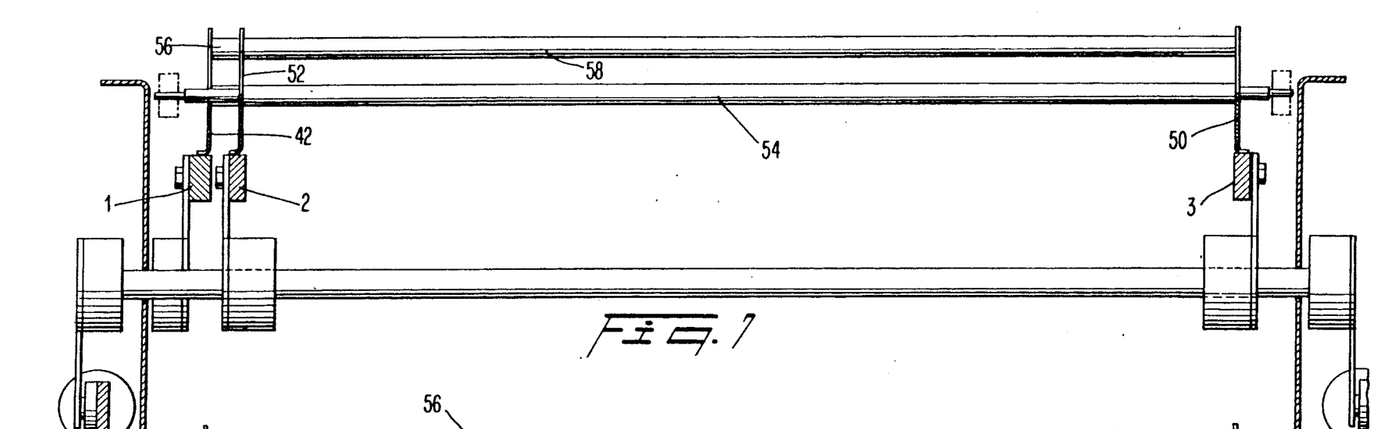
FIG. 7 is an end elevational view showing all three rails in their elevated positions.
Figure 8:
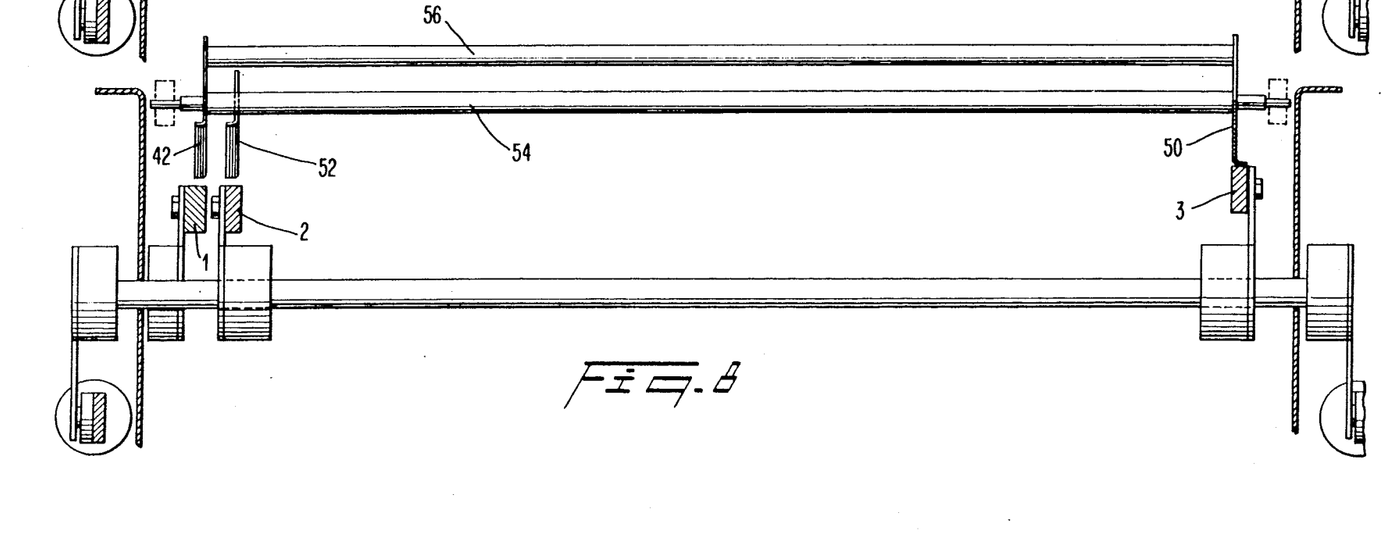
FIG. 8 is an end elevational view showing the third rail in its elevated position.
Figures 9, 10:
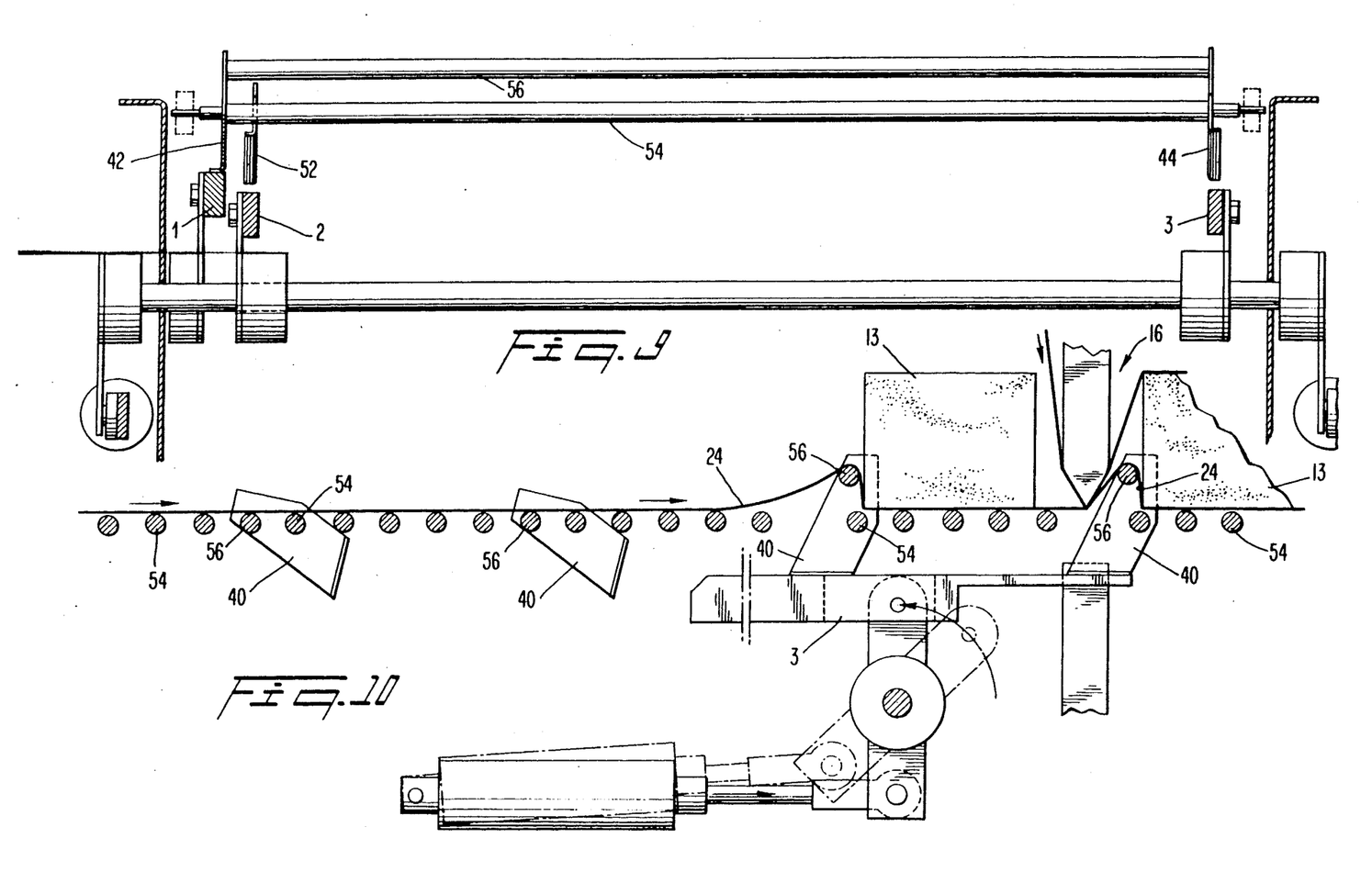
FIG. 9 is an end elevational view showing the first rail in its elevated position.
FIG. 10 is a diagrammatic side elevational view showing a suggested rail elevating mechanism.

FIGS. 7–9 and 13 perhaps best make it clear how differing buckets are raised by the rails. To lift every bucket, all three rails 1, 2 and 3 are lifted as depicted in FIG. 7. To lift alternate buckets, only the third rail is lifted as shown in FIG. 8, and to lift every third bucket, only the first rail is lifted as shown in FIG. 9. This may perhaps be best ascertained by studying the pattern of flanged connectors and unflanged connectors appearing in FIG. 13.

Figure 13:
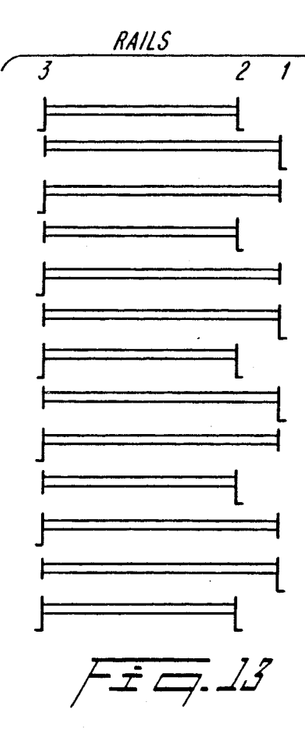
FIG. 13 is a diagrammatic representation of the preferred pattern of flanged and flat connectors.

FIG. 13 is further instructive because it shows the preferred pattern of short and long conveyor sections employed to build novel inlet conveyor section 12. As shown, all of the sections have a first end in longitudinal alignment with one another. Accordingly, the respective second ends thereof are in staggered longitudinal array as shown on the right hand side of FIG. 13. It should also be observed that each short section is followed by two long sections.

The pattern of flanged and flat connector plates on the respective first ends of the rollers alternate as clearly depicted in FIG. 13; thus, it should be easily understood how the elevation of rail 3 effects upward pivoting of alternate conveyor sections. It matters not whether the upwardly pivoted conveyor section is long or short since either will perform the function of abuttingly engaging and driving forwardly the trailing edge of its associated package 13.

It should be understood that FIG. 13 is a theoretical or conceptual diagram. As should be clear from studying FIGS. 11 and 12, there are actually three different roller lengths in the novel arrangement of rollers, but the longest of the three does not form the pattern of long and short roller sections as depicted in FIG. 13. More particularly, the longest roller 54 has its opposite ends pivotally secured in movably mounted conveyor chains or linkages which are disposed at laterally spaced opposite sides of the conveyor; said long roller is thus the axis about which either the short roller or the intermediate in length roller pivots when an obstacle is encountered by a flanged connector plate. For this reason, the opposite ends of the longest roller 54 have been deleted from FIG. 13, leaving only, in effect, the short and intermediate length rollers.

Thus, when the respective first ends of the short and intermediate length rollers are placed in longitudinal alignment as shown in FIG. 13, the respective second ends thereof form the two lane, staggered longitudinal alignment that is depicted.

It is also important to observe that although the pattern of one short section followed by two long sections (which are actually intermediate length sections for the reasons set forth above) is a repeating pattern of three sets, a larger pattern of six sets is employed when the connector plates are considered.

The six set repeating pattern of rollers, as shown in FIG. 13, is as follows:

a first (short) set of rollers having flanged connector plates at its opposite ends;

a second (long) set of rollers having a flat connector plate at its first end and a flanged connector plate and its second end;

a third (long) set of rollers having a flanged connector plate at its first end and a flat connector plate at its second end;

a fourth (short) set of rollers having a flat connector plate at its first end and a flanged connector plate at its second end;

a fifth (long) set of rollers having a flanged connector plate at its first end and a flat connector plate at its second end; and a sixth (long) set of rollers having a flat connector plate at its first end and a flanged connector plate at its second end.

In this particular embodiment, the mechanism for raising each rail is a pneumatic cylinder 60 and a linkage 62 that are diagrammatically depicted in FIG. 10, it being understood that there is a pneumatic cylinder 60 and a linkage 62 associated with each rail 1, 2, 3 and it being understood that many other mechanisms could be employed to raise and lower the rails. It should be stressed that the flanged connectors pivot downwardly under their own weight in the absence of rail support, there being no human intervention required to lower said raised connector plates once the end of a rail is reached.

Figure 14:
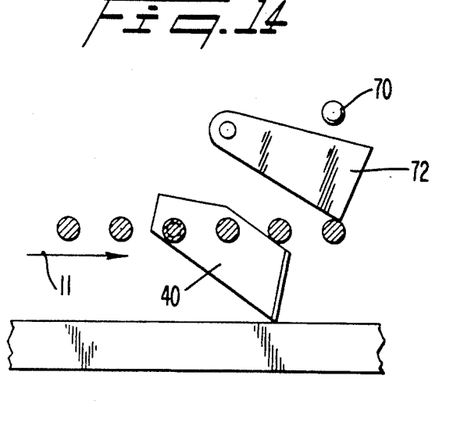
FIG. 14 is a side elevational view of the means employed to activate the cut and seal mechanism.
Figure 15:
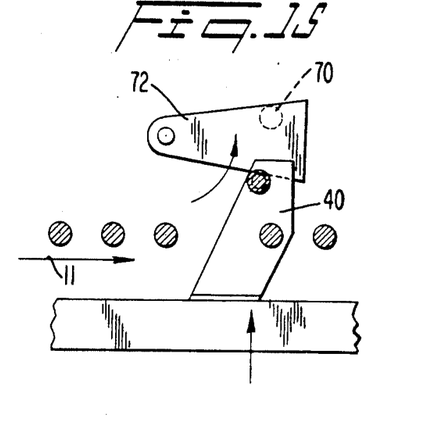
FIG. 15 shows the mechanism of FIG. 14 when activated.
Figure 16:
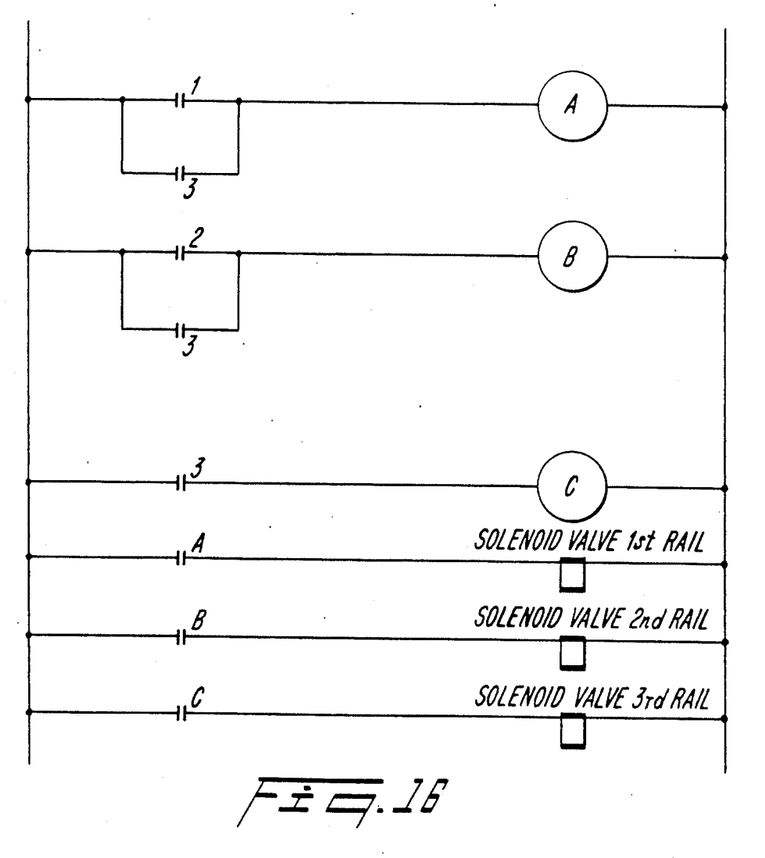
FIG. 16 shows an electrical circuit that controls the novel machine.

FIGS. 14 and 15 depict how an electric eye 70 is employed to trigger the operation of cut and seal station 16 so that a seal is made, as depicted in FIG. 6, at the trailing end of the package 13.

As shown in FIG. 14, a pivotally mounted opaque flat plate 72 rests atop the conveyor rollers as they travel in the direction of arrow 11; an unpivoted flanged connector plate such as plate 40 will travel therepast without activating eye 70, but an upwardly pivoted flanged connector plate such as plate 48 will transiently displace plate 72 as shown in FIG. 15, into the path of electromagnetic radiation emanating from eye 70, thereby activating eye 70 which sends a signal triggering activation of the sealing station 16.

Those skilled in the art of machine design will now be able, in view of this disclosure, to design machines having different structural parts that still perform the inventive method. The heart or essence of this invention resides in the method performed by the machine, and not just in the particular structure shown because such structure is merely one of many structures capable of performing the steps of the inventive method.

More particularly, the novel method broadly includes the steps of lifting above the plane of the inlet conveyor differing patterns of conveyor sections in a conveyor formed of a plurality of sections. The term "lifting" includes pivoting or any other motion that elevates a conveyor section above the horizontal plane of the conveyor so that said section can abuttingly engage the trailing edge of a package. The phrase "differing patterns" refers not only to a first pattern where every section or bucket is lifted or pivoted or otherwise elevated, nor does it exclusively refer to second and third patterns where alternate or every third bucket is raised, i.e., it includes an infinite number of differing patterns as well.

Moreover, the means for effecting the lifting of a preselected pattern of buckets is not limited to the staggered rails and flanged connectors of this disclosure. Any obstacle member positioned in the path of travel of the flanged connectors will serve the purpose of the rails depicted herein. Furthermore, the means for lifting the rails is not restricted to the pneumatic means shown herein. Hydraulic, magnetic, electromechanical and other means may also be employed in lieu of the pneumatic cylinders shown herein.

The novel method of selectively pivoting sections of a conveyor made of pivotally mounted roller sections more specifically comprises the steps of grouping preselected pairs of longitudinally contiguous rollers into pair groupings, pivotally securing opposite ends of one roller of each pair of rollers to a moving conveyor chain or linkage, connecting each pivotally secured roller to its paired roller by a connector plate means, configuring preselected connector plate means so that said preselected connector plate means have a part that depends therefrom and extends below the plane of the conveyor, placing an obstacle in the path of travel of said preselected connector plate means so that said conveyor section formed of paired rollers pivots upwardly about an axis defined by said pivotally secured roller when each preselected connector plate means encounters said obstacle, so that predetermined conveyor sections are automatically pivoted upwardly upon encountering said obstacle and so that said predetermined conveyor sections automatically pivot downwardly under their own weight when said obstacle is removed.

The invention also has utility in sundry applications outside of the shrink wrap packaging industry, i.e., the seal and cut station and the heat tunnel and other parts of the machine unrelated to the novel method of nonmanually lifting and lowering preselected patterns of buckets do not limit the scope of this invention.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A method for lifting preselected buckets of a bucket-type conveyor above the plane of the conveyor, comprising the steps of:
    affixing to each of a plurality of sets of preselected pivotally mounted buckets a member that rigidly depends therefrom;
    positioning below said buckets at least one movably mounted elongate rail member for each set having two positions of vertical adjustment; and
    raising a preselected elongate rail member to a height where it is disposed in the path of travel of said members depending from said preselected set of buckets so that each of said members pivots upwardly in response to encountering said elongate rail.

2. A method of selectively pivoting sections of a conveyor made of pivotally mounted roller sections, comprising the steps of:
    grouping preselected pairs of longitudinally continuous rollers into pair groups;
    pivotally securing opposite ends of one roller of each pair of rollers to a moving conveyor chain;
    connecting each pivotally secured roller to its paired roller by a connector plate means;
    configuring preselected connector plate means so that said preselected connector plate means have a part that depends therefrom and extends below the plane of the conveyor;
    placing an elongate rail member in the path of travel so said preselected connector plate means so that said conveyor section formed of paired rollers pivots upwardly about an axis defined by said pivotally secured roller when each preselected connector plate means encounters said elongate rail member
    whereby predetermined conveyor sections are automatically pivoted upwardly upon encountering said obstacle.

3. The method of claim 2, further comprising the step of movably mounting said elongate rail member so that it interferes with the path of travel of said connector plate means when in a first position and so that it is in non-interfering relation with said connector plate means path of travel when in a second position.

4. The method of claim 3, further comprising the steps of:
    dimensioning the pairs of rollers so that preselected first pairs of rollers include a long roller and a short roller and so that preselected second pairs of rollers include a long roller and a roller of intermediate length; and
    selecting the long roller of each pair of rollers to be the roller that is pivotally secured at its opposite ends to said conveyor chain.

5. The method of claim 4, further comprising the steps of forming a conveyor by repeating patterns of said first pair of rollers followed by two sets of said second pair of rollers so that there are two sets of said second pair of rollers for every one of said first pairs of rollers and so that said two sets of said second pair of rollers are disposed between said first pairs of rollers.

6. The method of claim 5, further comprising the step of aligning said first and second pairs of rollers so that the respective first ends thereof are in longitudinal alignment with one another and so that the respective second ends thereof are in staggered longitudinal alignment with one another.

7. The method of claim 6, further comprising the steps of forming said connector plate means at a first end of preselected pairs of rollers of said first pair of rollers so that said connector plate means are disposed in non-interfering relation to said elongate rail member when said elongate rail member is in its first position and when said elongate rail member is in its second position.

8. The method of claim 7, further comprising the steps of forming said connector plate means at a first end of preselected pairs of rollers of said first pair of rollers so that said connector plate means are disposed in non-interfering relation to said elongate rail member when said elongate rail member is in its second position and so that it is disposed in interfering relation to said elongate rail member when said elongate rail member is in its first position.

9. The method of claim 8, further comprising the step of forming said connector plate means at a first end of preselected pairs of rollers of said second pair of rollers so that said connector plate means are disposed in non-interfering relation to said elongate rail member when said elongate rail member is in its first position and when said elongate rail member is in its second position.

10. The method of claim 9, further comprising the step of forming said connector plate means at a second end of preselected pairs of rollers of said second pair of rollers so that said connector plate means are disposed in interfering relation to said elongate rail member when said elongate rail member is in its first position and so that said connector plate means are disposed in non-interfering relation to said elongate rail member when said elongate rail member is in its second position.

11. The method of claim 10, further comprising the step of arranging said first and second pairs of rollers in a longitudinal alignment whereby a repeating pattern of six pairs of rollers is formed, beginning with said first pair of rollers having elongate rail member-engaging connector plate means at its opposite ends, followed by a second pair of rollers having a non-elongate rail member-engaging connector plate means at its first end and an elongate rail member engaging connector plate means at its second end, followed by a second pair of rollers having a elongate rail member-engaging connector plate means at its first end and a non-elongate rail member-engaging connector plate means at its second end, followed by a first pair of rollers having a non-elongate rail member-connector plate means at its first end and elongate rail member-engaging connector plate means at it second end, followed by a second pair of rollers having an elongate rail member connector plate means at its first end and a non-elongate rail member-engaging connector plate means at its second end, followed by a second pair of rollers having a non-elongate rail member-engaging connector plate means at its first end and an elongate rail member-engaging connector plate means at its second end.

12. A conveyor apparatus of the type made of pivotally mounted sections, comprising:
a first conveyor section;
said first conveyor section including an elongate roller and a short roller disposed in parallel relation to one another;
a second conveyor section;
said second conveyor section including an elongate roller and an intermediate length roller disposed in parallel relation to one another;
said rollers of said first conveyor section being connected to one another by a pair of connector plate members disposed at their respective opposite ends;
said rollers of said second conveyor section being connected to ne another by a pair of connector plate members disposed at their respective opposite ends;
preselected connector plates of said pairs of connector plates having a flanged part that is specifically configured to depend downwardly from a horizontal plane within which said first and second conveyor sections are disposed;
a first obstacle means positioned below said horizontal plane;
said first obstacle means having a first, elevated position disposed in a path of travel of said flanged part so that said connector plate is pivoted upwardly when it encounters said first obstacle means; and
said first obstacle means having a second, lowered position disposed in spaced relation to said path of travel so that the rollers interconnected by said connector plates remain disposed in said horizontal plane when said obstacle means is in said lowered position.

13. The apparatus of claim 12, wherein preselected connector plates of said pairs of connector plates are flat and are disposed in spaced relation to said first obstacle means when said first obstacle means is in its elevated position and when said first obstacle means is in its lowered position.

14. The apparatus of claim 13, wherein a plurality of said first and second conveyor sections are longitudinally arrayed to form an elongate conveyor means, and wherein respective first ends of each of said first and second conveyor sections are disposed in longitudinal alignment with one another so that respective second ends of each of said first and second conveyor sections are disposed in staggered alignment with one another.

15. The apparatus of claim 14, wherein said plurality of first and second conveyor sections are longitudinally arrayed in a repeating pattern of a first conveyor section followed by two of said second conveyor sections.

16. The apparatus of claim 15, wherein alternate first conveyor sections of said plurality of conveyor sections have a flanged connector at both ends.

17. The apparatus of claim 16, wherein alternate first conveyors sections of said plurality of first conveyor sections have a flat connector plate at a first end thereof and a flanged connector plate at a second end thereof.

18. The apparatus of claim 17, wherein a leading second conveyor section of said plurality of second conveyor sections has a flat connector plate at a first end thereof and a flanged connector plate at a second end thereof.

19. The apparatus of claim 18, wherein a trailing second conveyor section of said plurality of second conveyor sections has a flanged connector plate at a first end thereof and a flat connector plate at a second end thereof.

20. In a conveyor of the type having plural pivotally mounted buckets that pivot upwardly above the plane of the conveyor in response to suitably directed external forces imparted thereagainst, means for pivoting preselected buckets, comprising:
a first pair of parallel roller members;
said first pair of roller members including an elongate roller and a short roller;
a flanged connector plate interconnecting a first end of said long roller and a first end of said short roller;
a flat connector plate interconnecting a second end of said long roller and a second end of said short roller;
a second pair of parallel roller members;
said second pair of roller members including an elongate roller and a short roller;
a flanged connector plate interconnecting a first end of said long roller and a first end of said short roller;
a flanged connector plate interconnecting a second end of said long roller and a second end of said short a third pair of parallel roller members;
said third pair of roller members including an elongate roller and an intermediate length roller;
a flanged connector plate interconnecting a first end of said elongate roller and a first end of said intermediate roller;
a flat connector plate interconnecting a second end of said long roller and a second end of said intermediate length roller;
a fourth pair of parallel roller members;

said fourth pair of roller members including an elongate roller and an intermediate roller;
a flat connector plate interconnecting a first end of said elongate roller and a first end of said intermediate length roller;
a flanged connector plate interconnecting a second end of said elongate roller and a second end of said intermediate length roller; and
a plurality of said first, second, third and fourth pairs of roller members being disposed in longitudinally spaced apart alignment with one another along the extent of said conveyor;
a first elongate longitudinally aligned, movably mounted rail member disposed below and in a common vertical plane with said first end of said plurality of said third and fourth roller members;
said first rail member having a lowered position where it is spaced downwardly of the respective flanged connector plate and said flat connector plates at said first end and having a raised position where it abuttingly engages said flanged connector plates and causes said intermediate length rollers having flanged connector plates at their respective first ends to pivot upwardly with respect to said long rollers;
a second elongate, longitudinally disposed, movably mounted rail member disposed below and in a common vertical plane with the respective first ends of said plurality of first and second rollers members;
said second rail member having a lowered position where it is spaced downwardly of the respective flanged connector plates at said first end of said plurality of first and second roller members and having a raised position where it abuttingly engages said flanged connector plates and causes said short rollers having flanged connector plates at their respective first ends to pivot upwardly with respect to their associated long rollers;
a third elongate, longitudinally aligned, movably mounted rail member disposed below and in a common vertical plane with the respective second ends of said first, second, third and fourth rollers:
said third rail having a lowered position where it is spaced downwardly of the respective flanged and flat connector plates at the respective second ends of said first, second, third and fourth rollers and having a raised position where it abuttingly engages flanged connector plates and causes said short rollers and said intermediate length rollers having flanged connector plates at their respective second ends to pivot upwardly with respect to their associated long rollers;
whereby preselected short and intermediate length rollers are pivoted upwardly dependent on which of the rail members are in their raised position.

* * * * *